Dec. 4, 1923.
J. W. MOON
METHOD OF MANUFACTURING TUBES
Filed March 14, 1921
1,476,632
3 Sheets-Sheet 1
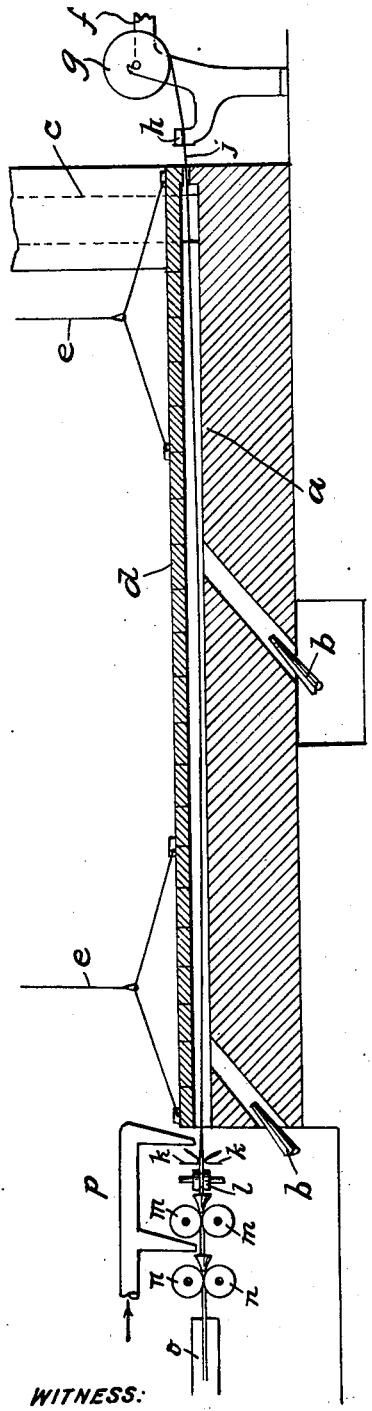
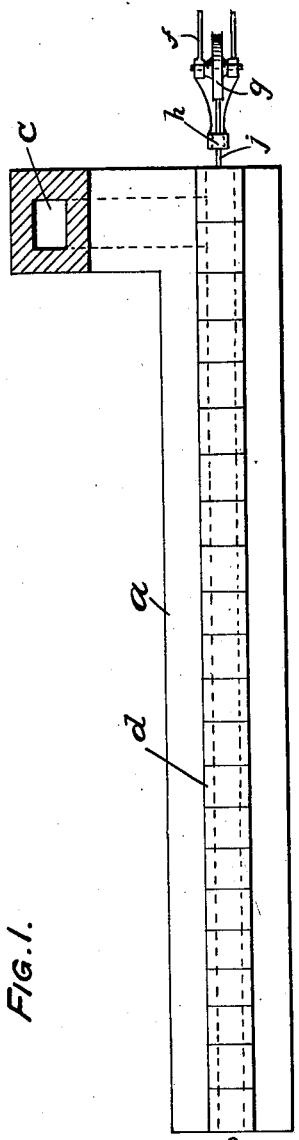
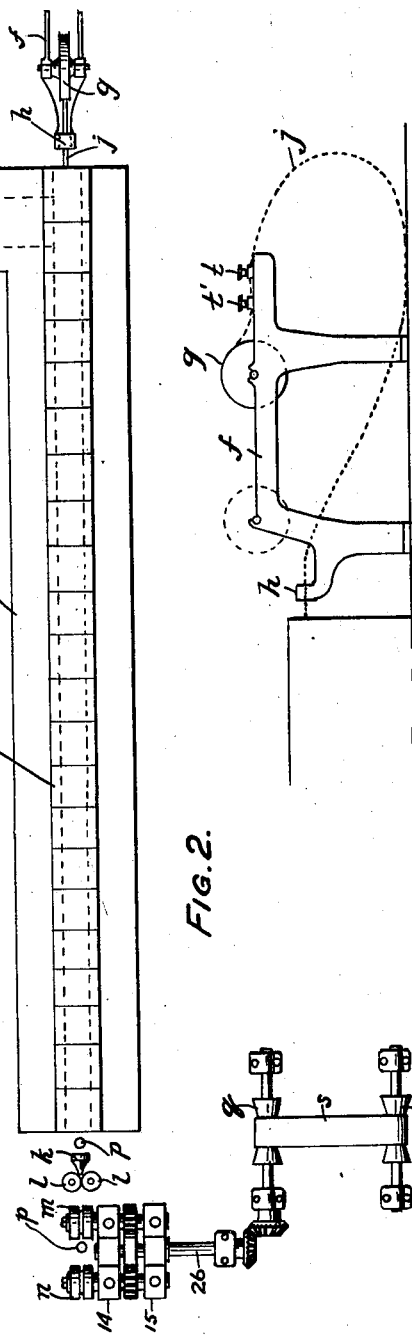
WITNESS:
INVENTOR
John W. Moon
BY
ATTORNEY.

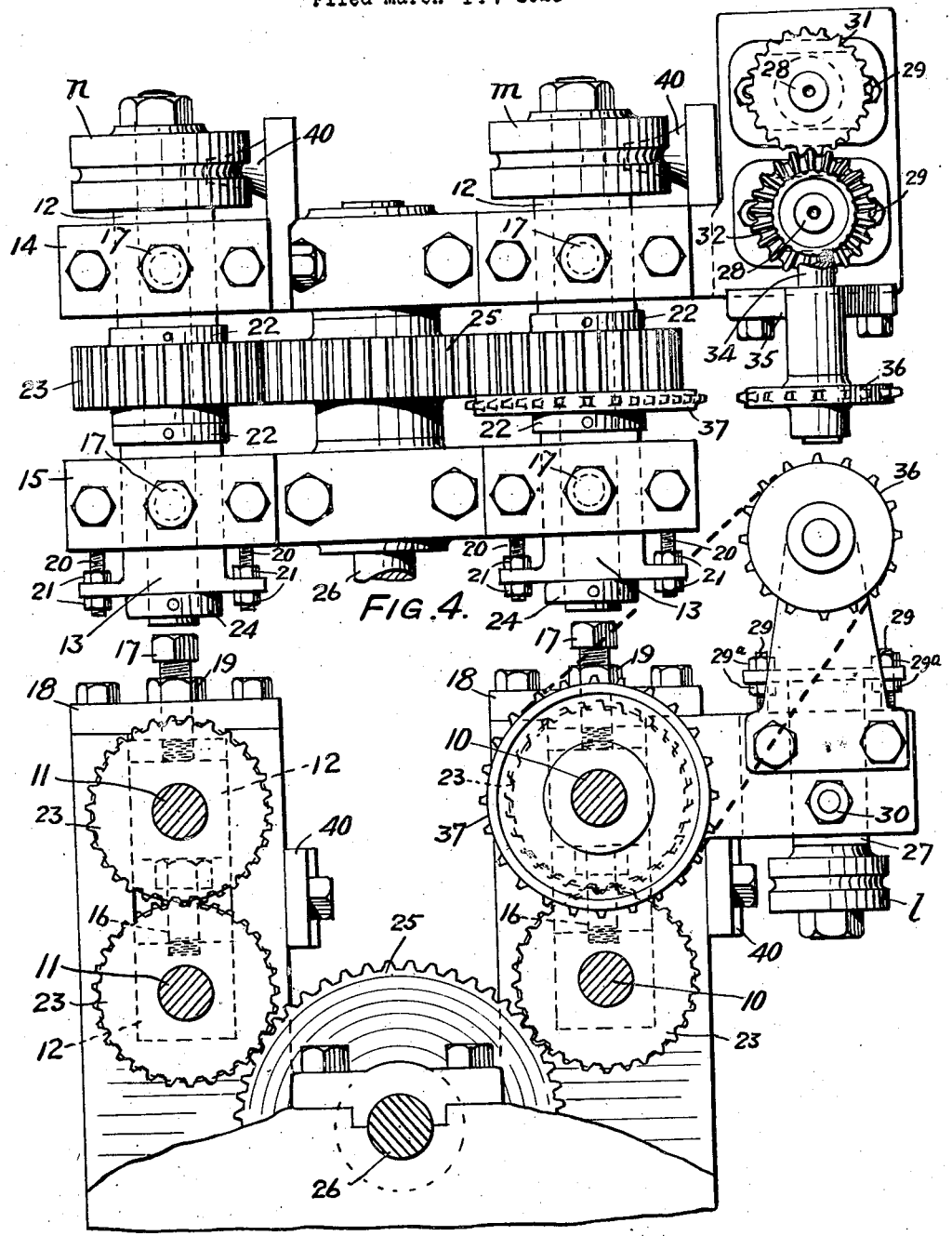

Dec. 4, 1923.

J. W. MOON 1,476,632

METHOD OF MANUFACTURING TUBES

Filed March 14, 1921   3 Sheets-Sheet 3

WITNESS:
Rob. R. Kitchel.

INVENTOR
John W. Moon
BY Frank L. Busser
ATTORNEY.

Patented Dec. 4, 1923.

1,476,632

UNITED STATES PATENT OFFICE.

JOHN W. MOON, OF LANSDOWNE, PENNSYLVANIA, ASSIGNOR TO FRETZ-MOON TUBE COMPANY, OF BUTLER, PENNSYLVANIA, A CORPORATION OF PENNSYLVANIA.

METHOD OF MANUFACTURING TUBES.

Application filed March 14, 1921. Serial No. 452,267.

*To all whom it may concern:*

Be it known that I, JOHN W. MOON, a citizen of the United States, residing at Lansdowne, county of Delaware, and State of Pennsylvania, have invented a new and useful Improvement in Methods of Manufacturing Tubes, of which the following is a full, clear, and exact description, reference being had to the accompanying drawings, which form a part of this specification.

This invention relates to an improvement in the method of manufacture of butt-welded tubes.

The object of my invention is to provide a method for the manufacture of tubes in a continuous manner at a relatively high speed with a minimum amount of furnace area and with the labor of minimum number of men so that I am enabled to make tubes of small diameter at such a low cost that the manufacture of tubes of one-eighth to one-half inch in diameter will be profitable in itself.

The precise nature of my invention will be best understood by reference to the accompanying drawings, in which is illustrated an apparatus capable of use in connection with the practice of my method.

Fig. 1 of the drawings is a longitudinal section through one form of apparatus for carrying out my process.

Fig. 2 is a plan view thereof.

Fig. 3 is a side elevation of the complete skelp reel rack.

Fig. 4 is a plan view of the tube rolling mill.

Fig. 5 is a side elevation with the housings at one side of the driving gears broken away.

Figure 6:
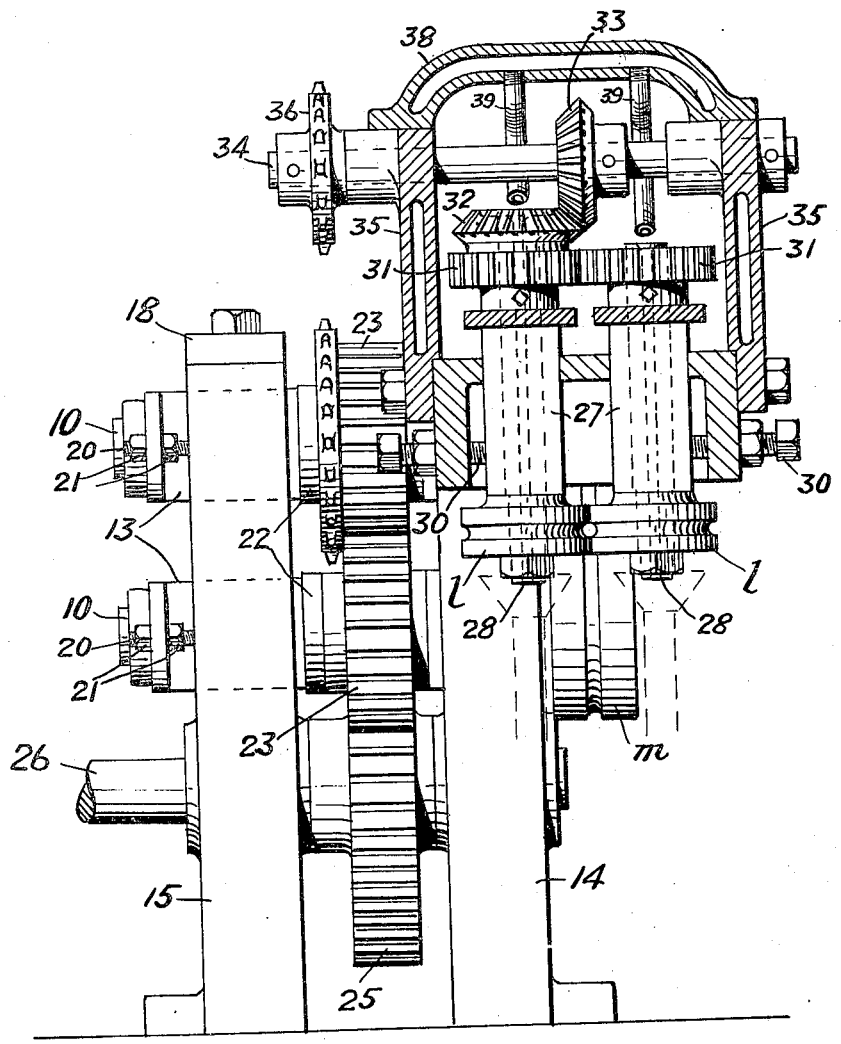
Fig. 6 is an end view partially in section.

In these drawings, the reference character $a$ designates a furnace in which the skelp is heated, which is provided with burners $b$ for heating the chamber through which the skelp is drawn. $c$ is the offtake flue at the front end of the furnace, and $d$ is the cover for the furnace chamber, which is arranged to be raised by means of lifting cables $e$, or any other suitable means.

$f$ is a frame for supporting the skelp feeding reels $g$ and is provided at one of its ends with a suitable guide $h$ which may be opened or closed and through which the skelp $j$ is drawn, and which guides the skelp into the opening at the front of the furnace.

The skelp passes from the furnace to the tube rolling mill between guides $k$, $k$, then successively between three sets of grooved rollers $l$, $l$, $m$, $m$, and $n$, $n$, between which it is first bent to shape and welded, and afterwards rolled to size.

Extending from any suitable source is an air conduit $p$ having a nozzle for directing a blast of air or gas and air onto the skelp as it passes to the bending and welding rolls, as well as a nozzle for directing a blast of air to the seam of the tube between the two sets of sizing rolls $m$, $m$ and $n$, $n$. The continuous length of formed tube passes from the rolls $n$, $n$ to a trough $o$ which is of sufficient length to permit the formed tube to be cooled to a point at which it will not be bent by handling.

The formed tube is then cut to proper lengths at the end of the trough $o$ by suitable means, transferred to the usual hydraulic testing machine, and then tied into bundles for shipment. The various rolls are driven by means of driven cones $q$ and driving cones $r$ on the main driving shaft, through the medium of a belt $s$. These cones are arranged to be shifted along their shafts to vary the speed of the rolls.

In carrying out my process, the burners $b$, $b$ are first lighted to heat up the furnace, and as the cross-sectional area of the chamber for heating the skelp for the manufacture of tubes of three-quarter inch and under is small compared to that of the usual tube skelp heating furnaces, I am enabled to heat the furnace to the desired temperature in a short time. As it is not necessary to open the furnace for charging machines or hand-charging after the process has been started, I am enabled to maintain the temperature at the proper degree with a minimum amount of fuel.

After the furnace has been heated to the proper temperature, a reel $g$ containing a coiled strip of skelp $j$ is placed at the rear of the frame $f$, as shown in full lines in Fig. 1, one end of the strip of skelp having welded thereto a tang of the proper length and diameter. The cover $d$ is then raised and a portion of the skelp is laid on the hearth, a sufficient length being inserted to leave the end of the tang on the lower guide $k$ and just in front of the bending and welding rolls $l$, it being understood that the guide $h$ is formed to permit the ready insertion therein of the skelp and for guiding the skelp into the opening to the front of the furnace as it passes from the reel.

The cover $d$ is then placed in position and the rolls are set in motion, and as soon as the front end of the skelp has been heated to the proper temperature the end of the tang is inserted between rolls $k$, and as the rolls are all positively driven the tang will pass between the successive sets of rolls to the trough $o$, and draw the skelp through the furnace.

The temperature of the furnace may be such as to heat the skelp to about the cinder stage, or to a welding heat, as is common practice. But I prefer to heat the skelp only to about the cinder stage so as to avoid any liability of causing damage or deterioration of the skelp through overheating, and raise the temperature of the skelp by means of a blast of air (or other gas containing oxygen), directed through the conduit $p$, which will finally heat the skelp and clean the edges as it enters the bending and welding rolls. As both of the vertical rolls $l$ is provided with a substantially semi-circular groove, the flat skelp will be bent into cylindrical form and the edges of the skelp will be forced into contact with each other to form a butt weld, between these rolls, and while passing between the two sets of horizontal rolls the welded tube will be successively sized.

The rolling mill is constantly driven at a substantially uniform speed, determined by the heating capacity of the furnace, which speed should be at substantially the maximum heating capacity of the furnace, so as to remove the skelp from the rear or hottest end of the furnace as rapidly as it is heated to the working temperature. If the speed of the mill is too high or too low, it is regulated by shifting the driving and driven cones $r$ and $q$ along their shafts to vary the lineal speed of the belt $s$.

As the skelp from the reel $g$ nears the other end thereof, the strip is unwound and the end is clamped in a suitable clamp $t$ and the beginning of a strip of skelp on the next reel to be formed into a tube such as $g'$ (see Fig. 3) is clamped in position and the ends of the two strips of skelp are welded to each other. The clamps are then freed from the skelp and the reel $g'$ is placed in the position of the former reel $g$.

In carrying out the process in a continuous manner, after a full reel has been placed at the position $g$, a second reel is placed in position $g'$, and the beginning of the strip from reel $g'$ is placed in position in the clamp $t'$, the end of the strip or reel $g$ is uncoiled, clamped, welded to the end of the next strip of skelp and the skelp freed from the clamps before the mill draws all the slack between the furnace and the reel $g'$, so that the strip is drawn through the furnace continuously at a predetermined speed.

As the first set of rolls rotate about vertical axes and there is a circular pass between said rolls, they will simultaneously bend a flat piece of skelp and weld the edges to each other, and at the same time continuously free themselves of scale, so there is no danger of choking the pass and varying the shape or size of the forming and welding pass between the rolls.

I prefer to drive the sizing rolls at about the same speed, and drive the forming and welding rolls at a slower peripheral speed so that the tube will be drawn through the pass between the welding rolls.

The rolls $m$ are secured to the ends of spindles 10, 10 while, the rolls $n$ are similarly secured to spindles 11. 12 and 13 are bearing blocks for the spindles 10, the front blocks 12 being slidably mounted in the front housing 14, while the rear blocks are slidably mounted in the rear housing 15.

The lower blocks 12 and 13 are supported on the bottoms of windows in the housings, while the upper blocks are supported on adjustable screws 16 in the lower blocks. The upper blocks 12 and 13 are restrained against upward movement by means of adjusting screws 17 which are threaded in the caps 18 connected to the housings. 19 are lock nuts for securing the screws 17 in their adjusted positions.

20 are screw rods which extend laterally from the rear housing 15 through slots in flanges on bearing blocks 13. 21 are nuts arranged to permit longitudinal adjustment of the rolls $m$ and their spindles to line up the rolls $m$ with relation to each other as well as with the other rolls of the mill.

The spindles 11 are provided with similar blocks which are supported in the same manner as the blocks for the spindles 10, for adjusting the rolls $n$.

Connected to the lower spindle 10 between collars 22, also connected to the spindle, is a pinion 23. 24 is a collar connected to the lower spindle 10 on the outside of the block 13. The pinion 23 and the collars 22 completely fill the space between the bearing blocks 12 and 13. As the blocks 12 and 13 are confined between the collars 22 and 24 and the lower roll $m$, the spindle, blocks, pinion and roll can be moved longitudinally as a unit by means of the nuts 21. The upper spindle 10 as well as both spindles 11 are provided with a similar pinion 23 and collars 22 and 24 so that the rolls connected to these spindles and rolls thereon can be adjusted longitudinally with relation to each other. If desired, the front blocks 12 may also be adjusted and secured by screw rods or otherwise.

25 is a gear wheel connected to the main driving shaft 26, which is in turn driven through the medium of the belt *s* and the intermediate connections.

The shaft 26 is journaled in bearings in the front and rear housings 14 and 15 and between the lower spindles 10 and 11. The gear wheel 25 meshes with the pinions 23 on the lower spindles 10 and 11, which pinions 23 mesh with pinions 23 on their respective upper spindles so that all of the spindles 10 and 11 are positively driven.

The front housing 14 is provided with an overhung portion which forms a support for bearing blocks 27 for the spindles 28 of the vertical rolls *l*. 29 are threaded rods which extend upwardly through flanges on the blocks 27 from the overhung portion of the housing 14, and 29$^a$ are nuts thereon for raising and lowering the blocks 27. The upper ends of these blocks extend through openings in the housing and are adapted to rock therein so that the lower ends may be adjusted relative to each other by means of adjusting screws 30, for varying the size of the pass between the rolls *l* and for positioning the rolls laterally with relation to the rolls *m* and *n*.

Connected to the upper ends of the spindles 28 are pinions 31, which mesh with each other so as to drive one spindle from the other. 32 is a bevel gear connected to one of the spindles 28. The bevel gear 32 is driven by a second bevel gear 33 on a shaft 34, which is journaled in standards 35 on the overhung portion of the housing 14. 36 is a sprocket wheel on the shaft 34, which is driven from the upper spindle 10 by a sprocket chain connecting the sprocket wheel 36 to a sprocket wheel 37 on said spindle.

38 is a hollow brace member connected to the upper ends of the standards and is provided with a suitable water inlet pipe and outlet pipes 39. The lower ends of these outlet pipes are in line with the upper ends of openings through the spindles 28, while the lower ends of said spindles are in line with suitable offtakes for water passing from the pipes 39 through the spindles 28.

By this arrangement I am enabled to prevent the overheating of the bending and welding rolls, when making pipe in a continuous manner. 40 are guides in front of rolls *m* and *n* for guiding the tube to the passes between the rolls.

The advantages of my invention result from the provision of a method for forming butt-welded tubes of a length in excess of the length of the heating furnace, and which is carried out in such a manner that the strip is gradually heated in its passage through the furnace to the working temperature, which is substantially reached as it passes from the outlet end of the furnace.

This enables me to heat the skelp in a furnace of minimum area as well as to make uniform tubes uniformly throughout the day's run, and in which each portion of the tube or tubes of the run has been subjected to substantially the same temperature for substantially the same period of time.

I make herein no claim to the apparatus shown and described for carrying out my new process. The apparatus, however, embodies novel structural characteristics which are claimed in another application for patent, filed by me May 19, 1922, Serial No. 562,227, in which application is shown and described an apparatus embodying such novel structural characteristics.

Having now fully described my invention, what I claim and desire to protect by Letters Patent is:—

1. The process of manufacturing metal tubing, which comprises forming a metal strip into a tube and simultaneously and continuously moving said strip through a relatively long enveloping heating medium but short relative to the length of the strip to effect the gradual heating of the same throughout its entire cross-section and raising at least its edges to a welding heat and while so heated and as the strip continues to advance welding the edges together to form a tube.

2. The process of manufacturing metal tubing in a continuous manner from a plurality of strips of skelp, which comprises forming a metal strip into a tube and simultaneously and continuously moving said strip of metal through a relatively long enveloping heating medium to effect the gradual heating of the same throughout its entire cross-section and raising at least its edges to a welding heat and while so heated and as the strip continues to advance welding its edges to form a tube, and before the rear end of the moving strip enters the heating medium securing to it the forward end of the next strip.

3. The process of manufacturing metal tubing, which comprises forming a metal strip into a tube and simultaneously and continuously moving said strip of skelp through a relatively long enveloping heating medium to effect the gradual heating of the same throughout its entire cross-section and raising at least its edges to a welding heat and while so heated and as the strip continues to advance simultaneously bending the strip to cylindrical form and welding its edges to each other to form a tube.

4. The process of manufacturing metal tubing which comprises continuously moving a strip of skelp through a relatively long enveloping heating medium to effect the gradual heating of the same throughout its entire cross-section and raising at least its edges to a welding heat and while so heated and as the strip continues to advance simultaneously bending the strip to cylindrical form and welding its edges to each other to form a tube, and then sizing the tube while it is still heated.

5. The process of manufacturing metal tubing, which comprises forming a metal strip into a tube and simultaneously and continuously moving said strip through a relatively long enveloping heating medium to effect the gradual heating of the same from substantially cold throughout its entire cross-section and raising at least its edges to a welding heat and while so heated and as the strip continues to advance welding the edges together to form a tube.

In testimony of which invention, I have hereunto set my hand, at Philadelphia, Pa., on this 11th day of March, 1921.

JOHN W. MOON.